United States Patent [19]
Lehureau

[11] Patent Number: 5,880,914
[45] Date of Patent: Mar. 9, 1999

[54] RECORDING AND/OR READING DEVICE WITH MAGNETIC HEADS AND METHOD FOR THE MANUFACTURE THEREOF

[75] Inventor: Jean-Claude Lehureau, St Genevieve Des Bois, France

[73] Assignee: Thomson-CSF, Paris, France

[21] Appl. No.: 926,687

[22] Filed: Sep. 10, 1997

Related U.S. Application Data

[63] Continuation of Ser. No. 500,791, Jul. 11, 1995, abandoned.

[30] Foreign Application Priority Data

Jul. 26, 1994 [FR] France .................................. 94 09224

[51] Int. Cl.$^6$ ........................................................ G11B 5/29
[52] U.S. Cl. ............................................ 360/121; 360/115
[58] Field of Search ..................................... 360/121, 115

[56] References Cited

U.S. PATENT DOCUMENTS

| | | |
|---|---|---|
| 3,913,076 | 10/1975 | Lehureau et al. . |
| 3,919,698 | 11/1975 | Bricot et al. . |
| 3,971,002 | 7/1976 | Bricot et al. . |
| 4,023,033 | 5/1977 | Bricot et al. . |
| 4,025,784 | 5/1977 | Lehureau et al. . |
| 4,037,251 | 7/1977 | Bricot et al. . |
| 4,038,524 | 7/1977 | Puech et al. . |
| 4,039,764 | 8/1977 | Bricot et al. . |
| 4,059,841 | 11/1977 | Bricot et al. . |
| 4,079,247 | 3/1978 | Bricot et al. . |
| 4,079,248 | 3/1978 | Lehureau et al. . |
| 4,128,309 | 12/1978 | Lehureau et al. . |
| 4,138,663 | 2/1979 | Lehureau et al. . |
| 4,139,263 | 2/1979 | Lehureau et al. . |
| 4,142,208 | 2/1979 | Oprandi et al. . |
| 4,143,402 | 3/1979 | Bricot et al. . |
| 4,171,879 | 10/1979 | Bricot et al. . |
| 4,176,277 | 11/1979 | Bricot et al. . |
| 4,199,783 | 4/1980 | Huignard et al. . |
| 4,203,133 | 5/1980 | Bricot et al. . |
| 4,275,275 | 6/1981 | Bricot et al. . |
| 4,275,428 | 6/1981 | Lehureau . |
| 4,308,545 | 12/1981 | Lehureau et al. . |
| 4,334,300 | 6/1982 | Arquie et al. . |
| 4,380,016 | 4/1983 | Lehureau et al. . |
| 4,381,556 | 4/1983 | Bourdon et al. . |

(List continued on next page.)

FOREIGN PATENT DOCUMENTS

| | | |
|---|---|---|
| 0340085A3 | 2/1989 | European Pat. Off. . |
| 0407244A1 | 1/1991 | European Pat. Off. . |

*Primary Examiner*—Robert S. Tupper
*Attorney, Agent, or Firm*—Oblon, Spivak, McClelland, Maier & Neustadt, P.C.

[57] ABSTRACT

Disclosed is a recording and/or reading device with magnetic heads including at least two magnetic heads. A magnetic circuit for the closing of the magnetic flux has a pad common to both heads. A first pole of a first type magnetically couples the common pad to the gap of the first head through a non-magnetic link. A second pole of a second type, separated from the first pole by a non-magnetic interval, magnetically couples the common pad to the gap of the second head. Such a device finds applications to a system for recording and/or reading, notably on magnetic tapes.

20 Claims, 4 Drawing Sheets

U.S. PATENT DOCUMENTS

| | | |
|---|---|---|
| 4,405,862 | 9/1983 | Bricot et al. . |
| 4,405,994 | 9/1983 | Cornet et al. . |
| 4,551,733 | 11/1985 | Cornet et al. . |
| 4,566,092 | 1/1986 | Gerard et al. . |
| 4,586,165 | 4/1986 | Cornet et al. . |
| 4,791,514 | 12/1988 | Huijer et al. . |
| 4,827,218 | 5/1989 | Meunier et al. . |
| 5,050,027 | 9/1991 | Meunier et al. . |
| 5,125,052 | 6/1992 | Lehureau et al. . |
| 5,134,516 | 7/1992 | Lehureau et al. . |
| 5,168,485 | 12/1992 | Lehureau et al. . |
| 5,172,368 | 12/1992 | Lehureau . |
| 5,182,781 | 1/1993 | Lehureau et al. . |
| 5,218,595 | 6/1993 | Lehureau et al. . |
| 5,229,874 | 7/1993 | Lehureau et al. . |
| 5,272,551 | 12/1993 | Lehureau et al. . |
| 5,337,172 | 8/1994 | Lehureau . |
| 5,347,380 | 9/1994 | Lehureau . |
| 5,349,400 | 9/1994 | Kaplan et al. . |
| 5,392,181 | 2/1995 | Lhureau et al. . |
| 5,396,482 | 3/1995 | Lehureau . |
| 5,477,405 | 12/1995 | Okada et al. .......................... 360/121 |
| 5,566,982 | 10/1996 | Lehureau et al. . |
| 5,657,304 | 8/1997 | Lehureau . |
| 5,659,536 | 8/1997 | Maillot et al. . |
| 5,671,106 | 9/1997 | Lehureau . |
| 5,745,329 | 4/1998 | Lehureau . |

RECORDING AND/OR READING DEVICE WITH MAGNETIC HEADS AND METHOD FOR THE MANUFACTURE THEREOF

This application is a Continuation of application Ser. No. 08/500,791, filed on Jul. 11, 1995, now abandoned.

BACKGROUND OF THE INVENTION

1. Field of the Invention

The present invention relates to a recording and/or reading device with magnetic heads arranged notably in matrix form.

This device is designed to be mounted, for example, in magnetic recorders such as those used in computers or in on-board equipment or else in video recorders and tape recorders for professional use as well as for large-scale consumer applications.

A magnetic head is formed by a magnetic circuit, with a gap, associated with at least one conductor to which there is applied the signal to be recorded on a medium positioned in the vicinity of the gap. This signal creates a magnetic field in the magnetic circuit and this is used to magnetize a small portion of the medium that is in a position facing the gap.

2. Description of the Prior Art

For the recording and reading of information elements, it is increasingly being sought to miniaturize recording/reading heads so as to increase the density of information elements on a recording medium. For this purpose, it has been necessary to make heads in thin layers or thin films.

It is also sought to associate several magnetic heads so as to get rid of the movements of the head. This enables also an increase in the speed of writing of information elements on the medium. This has led to the grouping of several heads in rows or even in matrix form.

The patent FR 2 630 853 describes a matrix device with magnetic heads made in thin layers.

This device is formed by a grooved magnetic substrate with pads arranged in rows and columns. Row conductors and column conductors are positioned in the grooves and covered and/or embedded in a non-magnetic material. A first magnetic layer is deposited on one in every two columns of pads. This layer is designed to form the first poles of each magnetic head. On this first magnetic layer and on the rest of the substrate, a layer of a non-magnetic material is deposited. This layer includes a flank of the first layer. This non-magnetic layer is designed to form the gaps of the magnetic heads. Then, on the layer of non-magnetic material, a second layer of magnetic material is deposited. This second layer is designed to form the second poles of the magnetic heads.

It surmounts the pads that are not covered by the first magnetic layer. A machining operation, a polishing operation and a cutting operation enable the poles to be made flush and makes it possible to demarcate them as well as the gaps.

A non-magnetic link is made beneath the second formed poles. It connects the gaps of two heads located in neighboring columns.

In this type of device, two magnetic heads located in neighboring columns do not have identical performance characteristics during a recording caused by one and the same flux for two linked gaps are symmetrical.

This difference in performance characteristics is further increased when the gap, instead of being perpendicular to the surface of the substrate, is now tilted.

A pole whose upper surface forms an acute angle with the gap starts getting saturated for a lower intensity of flux than does a pole whose upper surface forms an obtuse angle with the gap.

SUMMARY OF THE INVENTION

The present invention relates to a recording and/or reading device with magnetic heads arranged so as to prevent this variability of performance characteristics.

More specifically, a device with magnetic heads according to the invention comprises at least two magnetic heads, the magnetic circuit for closing the magnetic flux having a pad common to the two magnetic heads. According to the invention, a first pole of a first type magnetically couples the common pad to the gap of the first magnetic head through a non-magnetic link and a second pole of a second type, separated by a non-magnetic interval from the first pole, magnetically couples the common pad to the gap of the second magnetic head.

The thickness and the surface of the non-magnetic interval may be such that the first pole of a first type plays a part in the operation of the first magnetic head and such that the second pole of a second type plays a part in the operation of the second head.

In one variant, the thickness and the surface of the non-magnetic interval are such that the first pole of a first type and the second pole of a second type both play a part in the selective operation either of the first magnetic head or of the second magnetic head.

Advantageously, the device with magnetic heads may comprise a magnetic substrate with at least one succession of common pads. One of the magnetic heads comprises two successive pads as well as a pole of a first type and a pole of the second type. These two poles each surmount one of the pads and face each other in defining the gap. Each of these poles forms a pair with another pole of another type than itself, surmounting the same pad as itself. This other pole contributes to defining the gap of a neighboring head. The non-magnetic link prepared beneath the poles of a first type is located for both consecutive pads on the same side of the non-magnetic interval.

The non-magnetic link links the gap of the first magnetic head to the non-magnetic interval in forming a single layer. Preferably, the gap of the first head, the non-magnetic interval and the non-magnetic link have the same thickness.

Preferably, it is seen to it that each pole occupies about half the surface area of a pad.

The present invention relates to a method for the making of a device with magnetic heads. This method consists in:

- depositing a first magnetic layer on a part of the pad in preparing a flank on the pad, this layer being designed to form the second pole of a second type;
- depositing a layer of a non-magnetic material on the rest of the pad and at least partially on the first magnetic layer in including the flank;
- depositing a second magnetic layer on the layer of non-magnetic material, this second magnetic layer being designed to form the first pole of a first type, the layer of non-magnetic material being designed to form the non-magnetic interval, the non-magnetic link and the gap that couples the first pole of the first type;
- machining and polishing the layers so as to make the first layer flush;
- cutting out the contour of the poles, the non-magnetic interval and the gap.

BRIEF DESCRIPTION OF THE DRAWINGS

The invention will be understood more clearly and other characteristics and advantages of the invention shall appear from the following description of its embodiments, this description being made with reference to the appended drawings, of which.

MORE DETAILED DESCRIPTION

Figure 1A:
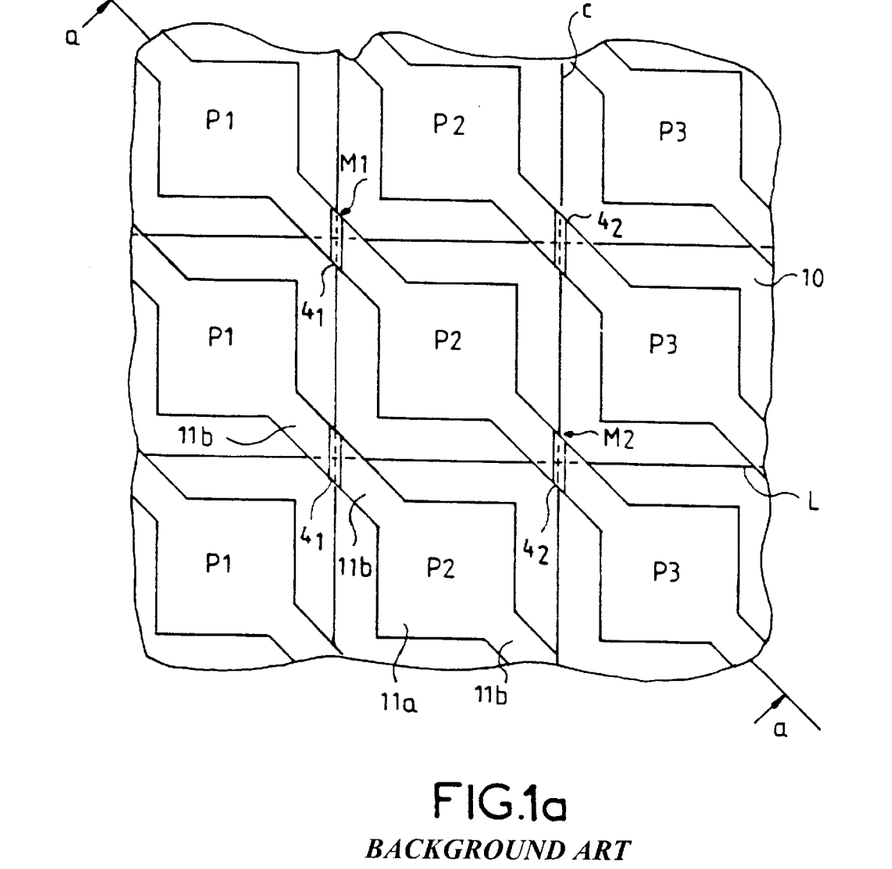
FIGS. 1a, 1b show partial views, respectively from the front and in a section along the axis a—a of a known matrix device with magnetic heads.
Figure 1B:
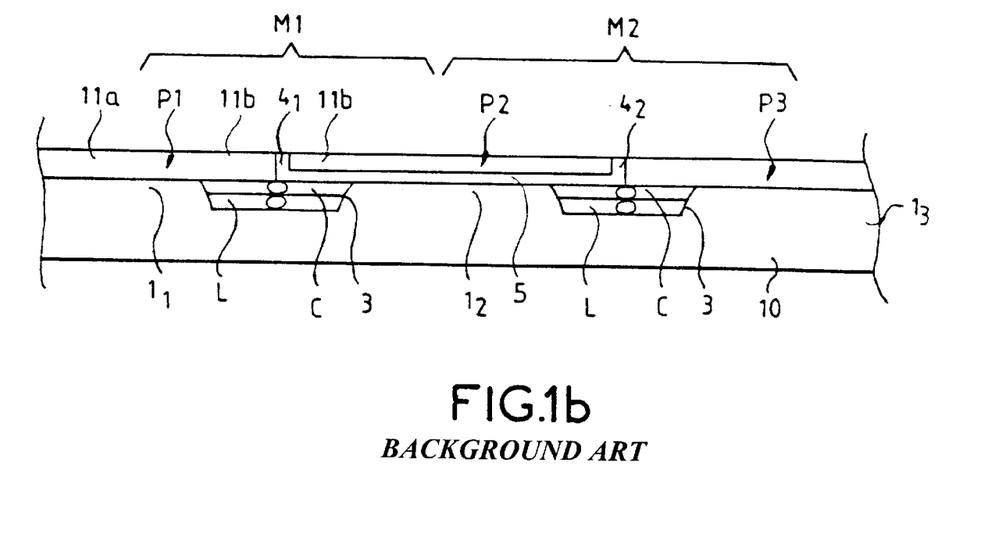

FIGS. 1a, 1b show partial views, respectively from the front and in a section along the axis a—a of a known matrix device with magnetic head.

This device is formed by a grooved magnetic substrate 10 with substantially square-shaped projecting pads arranged in the form of a matrix network. The pads are referenced $1_1$, $1_2$, $1_3$ ... Two pads of one and the same column have the same reference. The subscript number of each pad reference corresponds to the rank of the column. The pads cannot be seen in FIG. 1a.

Row excitation conductors L and column excitation conductors C are positioned in the grooves 3 and are covered and/or embedded in a non-magnetic material. Each pad $1_1$, $1_2$, $1_3$ is surmounted by a pole P1, P2, P3. The poles of one and the same column bear the same reference and the number in this reference corresponds to the rank of the column. All the poles (except of course the edge poles) have a part 11a with a greater surface area that corresponds substantially to the surface area of a pad $1_1$ and two protruding features 11b that extend two of their corners diagonally. These protruding features 11b surmount the intersection between two grooves 3. A gap $4_1$, $4_2$ ... is made between two facing protruding features 11b. The gaps $4_1$, $4_2$ are placed above the intersection of a row conductor L and a column conductor C. All the gaps located above the same column conductor C have the same subscript number.

A magnetic head M1 for example has a magnetic circuit for the closing of the flux formed by the two neighboring pads $1_1$, $1_2$ located diagonally in the matrix network, the portion of the substrate 10 that connects these two pads, the poles P1, P2 that surmount each of these pads $1_1$, $1_2$ and the gap $4_1$ between these two poles P1, P2. Head MI also has the column conductor C and the row conductor L which intersect beneath the gap $4_1$.

Similarly, the magnetic head M2 having a pad $1_2$ in common with the magnetic head M1 comprises a magnetic circuit formed by the two pads $1_2$ and $1_3$, the substrate portion 10 that connects them, the two poles P2, P3 which surmount each of these pads and the gap $4_2$ between the two poles P2, P3. Head M2 also includes the two conductors C, L that intersect beneath the gap $4_2$. These two heads M1 and M2 also have a common pole P2. The method for making the poles and the gap consists of the deposition, at one in every two columns of pads, of a first magnetic layer designed to form the first poles P1, P3 of each head, covering the other pads with a non-magnetic layer that includes at least one flank of the first layer, covering the non-magnetic layer with a second magnetic layer designed to form the second poles P2 . . . of each head.

The non-magnetic layer is designed to form the gaps $4_1$, $4_2$. The last steps are the machining, polishing and cutting steps which are used to make the poles flush and to demarcate them as well as the gaps.

In this type of device, there remains a non-magnetic link 5 beneath the second formed poles P2 . . . and this non-magnetic link 5 connects two gaps $4_1$, $4_2$ that are located on either side of the second poles P2.

The gaps $4_1$, $4_2$ connected by this non-magnetic link 5 are symmetrical. The two gaps $4_1$ and $4_2$ associated with a non-magnetic link portion are oriented in opposite directions. The two successive magnetic heads M1, M2 that possess these gaps $4_1$ and $4_2$ are not identical. They are opposite. This leads to differences in level between the recordings made by these two heads when they are crossed by a flux of a same intensity.

Figure 2:
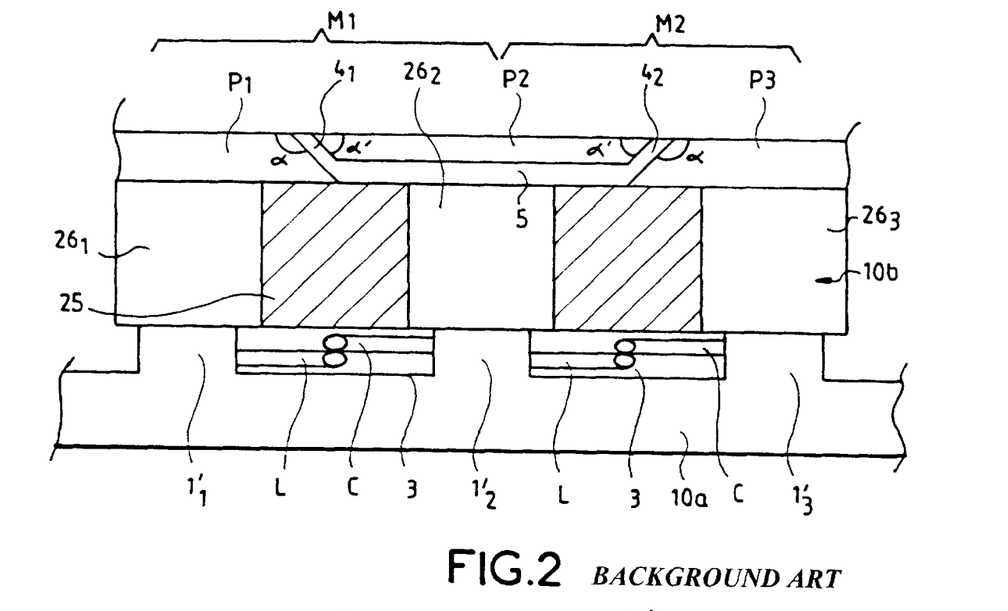
FIG. 2 shows a sectional view of a variant of a known matrix device with magnetic heads.

FIG. 2 gives a partial cross-sectional view of a variant of a known type of recording and/or reading device with magnetic heads. In this variant, the magnetic substrate, instead of being a one-piece unit, is formed by the joining of two superimposed elementary substrates. The first substrate 10a is grooved with projecting parts $1'_1$, $1'_2$, $1'_3$ positioned in a matrix network. Row conductors L and column conductors C are arranged in the grooves 3. The second elementary substrate 10b is a composite substrate. Second elementary substrate 10b is formed by a magnetic block $26_1$, $26_2$, $26_3$ . . . arranged in the same matrix network and separated by a non-magnetic material 25. The blocks $26_1$, $26_2$, $26_3$ . . . are sized so that each covers a projecting part $1'_1$, $1'_2$, $1'_3$ . . . and the non-magnetic material 25 covers the space between the projecting parts $1'_1$, $1'_2$, $1'_3$. The joining of the two substrates 10a and 10b can be done by bonding. The projecting parts $1'_1$, $1'_2$, $1'_3$, each covered with a block $26_1$, $26_2$, $26_3$ . . . , form pads.

The poles P1, P2, P3 . . . and the gaps $4_1$, $4_2$, $4_3$ are formed in the same way as here above, with the poles surmounting the pads $26_1$, $26_2$ and the gaps surmounting the non-magnetic material 25.

In this variant, the gap of each head is tilted with respect to the surface of the composite substrate 10b and the tilts of the gaps $4_1$, $4_2$ of two successive heads having a common pad are supplementary.

This tilt further aggravates the differences in performance characteristics between two heads having linked gaps. The reference α represents the obtuse angle formed by the gap $4_1$ with the upper surface of the first formed pole Pi and α' represents the acute angle formed by this gap $4_1$ with the upper surface of the second formed pole P2.

Figure 3A:
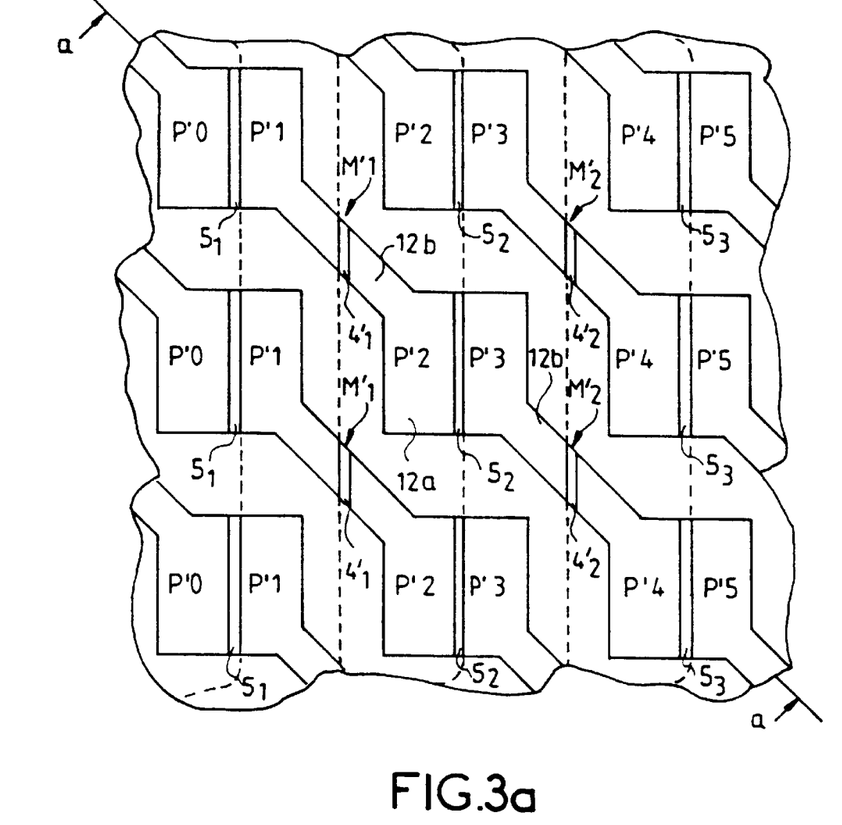
FIGS. 3a, 3b show partial views respectively in a front view and a sectional view along the axis a—a of an example of a matrix device with magnetic heads according to the invention.
Figure 3B:
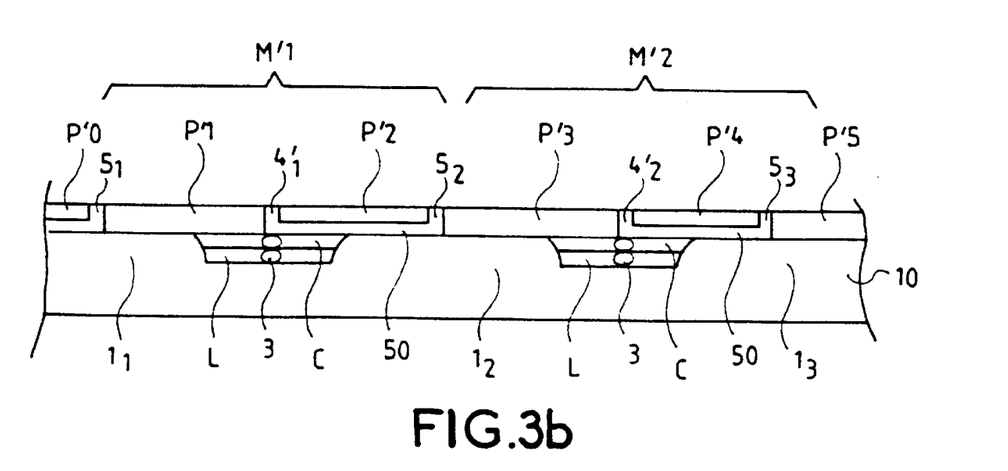

FIGS. 3a and 3b show partial views respectively in a front and cross-sectional view (along the axis b—b) of an exemplary recording and/or reading device with magnetic heads according to the invention. These two figures are comparable to FIGS. 1a and 1b. They again show the same grooved substrate 10 with projecting pads $1_1$, $1_2$, $1_3$ arranged in a Cartesian reference system. Row excitation conductors L and column excitation conductors C are positioned in the grooves 3 and are embedded and/or covered with a non-magnetic material such as resin. For greater clarity, the conductors cannot be seen except in FIG. 3b. Poles P'0, P'1, P'2, P'3, P'4 . . . are positioned on the pads $1_1$, $1_2$, . . . but now a pad $1_1$, $1_2$ is covered with a pair of poles, respectively P'0, P'1 for the pad $1_1$, P'2 and P'3 for the pad $1_2$ etc. . . . . . In one pair of poles, for example P'2, P'3, a first pole P'2 of a first type magnetically couples the pole $1_2$ with the gap $4'_1$ of a first magnetic head M'1 through a non-magnetic link 50. The second pole P'3 of a second type magnetically couples the pad $1_2$ with the gap $4'_2$ of a second magnetic head M'2. The first type of pole P'3 is separated from the second type of pole P'2 by a non-magnetic interval $5_2$.

In the example shown in FIGS. 3a, 3b, the non-magnetic interval that surmounts a pad has the same subscript number as itself. The non-magnetic intervals that surmount the pads of one and the same column are preferably aligned. The pads $1_1$, $1_2$ . . . are pads common to two magnetic heads. The poles P'0, P'1, P'2 have a part 12a with a greater surface area corresponding to about half the surface area of a pad $1_1$, $1_2$, $1_3$ . . . and at least one protruding feature 12b that extends one of their corners towards an intersection of excitation conductors C, L. The protruding features 12b of two poles, for example P'2, P'3 surmounting one and the same pad $1_2$ are preferably directed along a diagonal of the pad $1_2$. The gaps $4'_1$, $4'_2$ . . . are made between two facing protruding features 12b. These gaps $4'_1$, $4'_2$ . . . are positioned above the intersection of a row conductor L and a column conductor C above a groove 3. The gaps $4'_1$ of one and the same column are preferably positioned so as to be aligned. The rows of gaps and non-magnetic intervals may preferably be substantially parallel.

The magnetic head M'1 has a magnetic circuit for closing the flux formed by the pad $1_1$, the pad $1_2$, the portion of the substrate 10 that links them, the pole P'1, the pole P'2 and the gap $4'_1$ between them. It also has the column conductor C and the row conductor L which intersect beneath the gap $4'_1$.

In the same way, the magnetic head M'2 which has the pad $1_2$ in common with the head M'1 has a magnetic circuit formed by the common pad $1_2$, the pad $1_3$ and the substrate portion that links them, the poles P'3 and P'4 and the gap $4'_2$ between these two poles. Head M'2 also has the row conductors L and column conductors C which intersect beneath the gap $4'_2$.

The two poles P'2, P'3 of a pair contribute to defining two gaps $4'_1$, $4'_2$ belonging to successive heads M'1, M'2. The pole P'2 of the first type participates in the working of the head M'1 and the pole P'3 of the second type in the working of the head M'2. However, it may be the case, if the thickness and surface of the non-magnetic interval $5_2$ are appropriate, that the two poles of the pair P'2 and P'3 both play a part in the selective operation either of the first magnetic head M'1 or of the second magnetic head M'2.

In the example described, the non-magnetic link 50 links a non-magnetic interval $5_2$ in passing beneath one of the poles P'2 of a first type of a pair surmounting the same pad $1_2$ as the interval $5_2$, to the gap $4'_1$ to the definition of which a contribution is made by the first type pole P'2 of the pair. The non-magnetic interval $5_2$, the gap $4'_1$ and the non-magnetic link 50 are formed by a same layer of magnetic material. Preferably, the non-magnetic interval $5_2$, the gap $4'_1$ and the non-magnetic link have the same thickness.

At two consecutive pads $1_1$, $1_2$, $1_3$, this link 50 is located on the same side of the non-magnetic interval $5_2$, $5_3$ with which it is linked.

FIG. 3b clearly shows that two consecutive heads M'1, M'2 are now identical at the poles and the gaps. The gaps $4'_1$, $4'_2$ of these two heads are no longer linked. When they are crossed by fluxes of a same intensity, they generate a same level of recording.

Figure 4A:
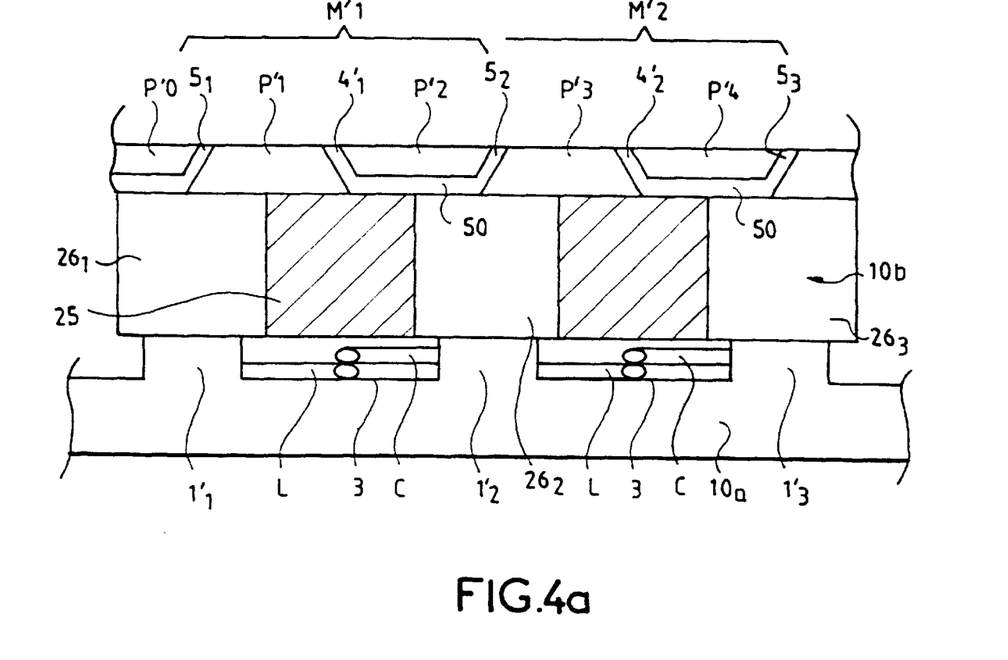
FIGS. 4a, 4b show a sectional view of two variants of a matrix device with magnetic heads according to the invention.

FIG. 4a, in the same way as FIG. 2, shows a partial sectional view of a variant of a device with magnetic heads according to the invention.

The magnetic substrate is formed by the joining of two superimposed elementary substrates 10a and 10b and these substrates are identical to those of FIG. 2.

The poles P'0, P'1, P'2, P'3, P'4 are formed above the composite elementary substrate 10b as well as the gap $4'_1$, $4'_2$.

The magnetic blocks $26_1$, $26_2$ . . . of the magnetic substrate are each covered with two poles, respectively P'0 and P'1, P'2 and P'3 etc. and these two poles are separated by the non-magnetic interval, respectively $5_1$, $5_2$ . . . The magnetic blocks contribute to forming pads. FIG. 4a again shows also the non-magnetic links 50 between a non-magnetic interval $5_2$ and a gap $4'_1$ formed in passing beneath a first type of pole P'2.

However now the gaps $4'_1$ and $4'_2$ are tilted instead of being perpendicular to the surface of the composite substrate 10b and therefore that of the pads. The gaps $4'_1$ and $4'_2$ Of two successive magnetic heads M'1 and M'2 preferably have the same tilt. The differences in performance between two successive magnetic heads M'1, M'2 having a common pad are eliminated. In this variant, the non-magnetic intervals $5_1$, $5_2$ are also tilted with respect to the surface of the composite substrate 10b and hence that of the pads. The tilts of two non-magnetic intervals $5_1$, $5_2$ are preferably the same.

Figure 4B:
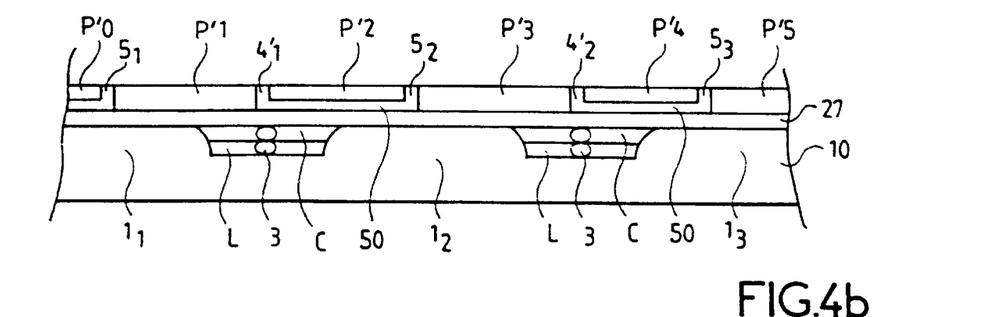

FIG. 4b shows a partial sectional view of a recording and/or reading device with magnetic heads according to the invention comparable to that of FIGS. 3a, 3b.

In this variant, the grooves 3 of the magnetic substrate 10 are no longer filled with a magnetic material such as a resin.

A plate 27 of a non-magnetic material covers the substrate 10 and the poles P'0, P'1, P'2 . . . , the gaps $4'_1$, $4'_2$ and the non-magnetic intervals $5_1$, $5_2$, $5_3$ are deposited on the plate 27.

Figure 5A:
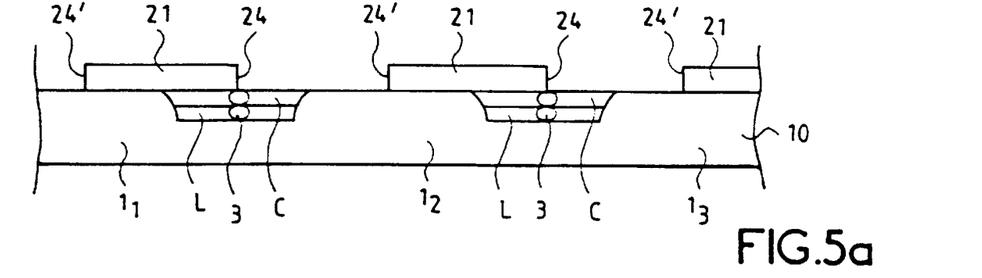
FIGS. 5a, 5b, 5c show sectional views of the matrix device of FIG. 3a in the process of being made.
Figure 5B:
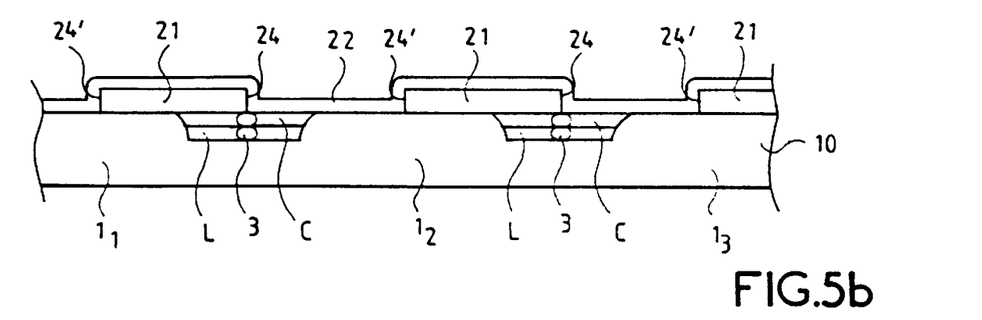
Figure 5C:
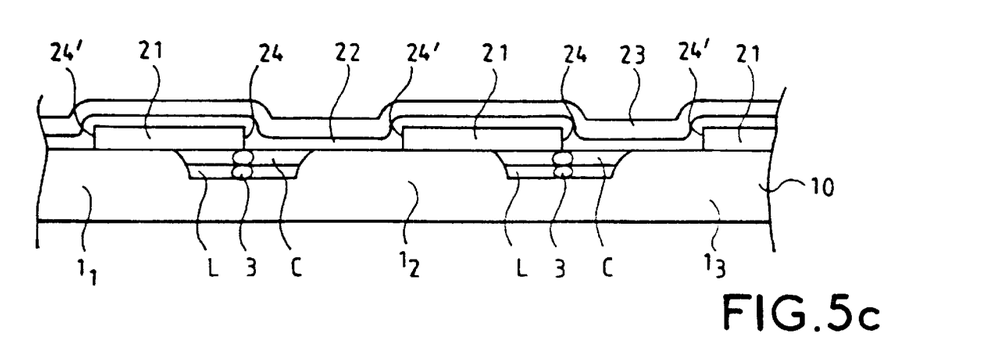

FIGS. 5a, 5b, 5c to be examined with reference to FIGS. 3a and 3b show partial sectional views of a device with magnetic heads in the process of being made.

The method starts with a magnetic substrate 10, made of ferrite for example, grooved with the pads $1_1$, $1_2$, $1_3$ arranged in a matrix network and having row conductors L and column conductors C. These conductors are positioned in the grooves 3 and embedded in a non-magnetic material such as glass for example.

Instead of embedding the row conductors L and the column conductors C in a non-magnetic material, it is also possible to cover the substrate 10 with a non-magnetic plate (not shown).

To form the poles, the gaps and the non-magnetic intervals in thin layers, the following procedure is used.

First, a first layer 21 of magnetic material is deposited above the substrate 10 or the non-magnetic plate. This layer 21 forms bands directed along the columns of pads and they cover a part of each pad $1_1$, $1_2$, $1_3$. This layer will have a flank 24' on the pads $1_1$, $1_2$, $1_3$.

This layer 21 is designed to form a second type of pole P'1, P'3, P'5 of each pair of poles (FIG. 5a).

To make this deposit, a first mask is used. The contour of this mask is shown in dashes in FIG. 3a.

This mask is designed to protect the zones that have to be covered with non-magnetic material. This mask has one edge that passes through the gaps $4'_1$, $4'_2$ and through the non-magnetic intervals $5_1$, $5_2$, $5_3$. In this way, the first magnetic layer 21 has one flank 24 above the grooves between two pads.

The second step consists in depositing a layer 22 of non-magnetic material. It has a thickness smaller than that of the first magnetic layer 21. This non-magnetic layer 22 covers the surface of the substrate or of the plate and rises on the first layer 21 so as to include its flanks 24 and 24'. In FIG. 5b, the non-magnetic layer 22 entirely covers the first magnetic layer 21 but this is not obligatory. It is enough for it to include its flanks.

This non-magnetic layer 22 is designed to form the gaps $4'_1$, $4'_2$, the non-magnetic intervals $5_1$, $5_2$ and the non-magnetic links 50.

In a third step, a second magnetic layer 23 is deposited on the non-magnetic layer 22. It is designed to form a first type of poles P'0, P'2, P'4 of the pairs of poles (FIG. 5c).

The next step consists of the machining and polishing of the layers thus deposited so as to make the first magnetic layer 21 flush.

The contour of the poles is then cut out. In the example described, each pole P'0, P'1, . . . occupies substantially half of the surface area of a pad $1_1$, $1_2$ . . . Other configurations are possible. The cutting out operation also demarcates the gaps and the non-magnetic intervals. It is preferable that the non-magnetic intervals $5_2$ should be entirely contained in the surface area of the pads so as to prevent leakage fields.

This step can be carried out by chemical or ion photo-etching with a second mask that shields the zones to be preserved. FIG. 3b shows the device of magnetic heads thus obtained.

As a variant, instead of using a single-piece substrate, it is possible to use a substrate formed by the joining of two elementary superimposed substrates such as the one shown in FIG. 4a. The first elementary substrate 10a is obtained conventionally by grooving a block of magnetic material such as ferrite to obtain the projecting parts $1'_1$, $1'_2$, $1'_3$.

The second elementary substrate 10b is obtained by making grooves in a piece of magnetic material to obtain the blocks $26_1$, $26_2$, by filling the grooves with a magnetic material 25. The two substrates 10a, 10b are assembled by bonding for example so that the projecting parts $1'_1$, $1'_2$ are covered with the blocks $26_1$, $26_2$. Machining is then used to eliminate the base of the second substrate 10b. The row conductors L and column conductors C are positioned in the grooves of the first substrate 10a. The poles, the gaps and the non-magnetic intervals are then deposited on the second substrate 10b.

All the examples described relate to a recording and/or reading device with magnetic heads arranged in a matrix network. It goes without saying that the recording and/or reading device according to the invention may have magnetic heads arranged otherwise, in a line for example, so as to form a strip. Instead of being rectilinear, the excitation conductors would then be coiled around the pads.

In the figures, which relate only to exemplary embodiments, the poles are located on the upper surfaces of the pads and these faces form a substantially plane surface. It is possible to envisage a case where this surface would be slightly curved.

Here above, various variants of substrates and poles have been described. It is of course possible to combine these variants with one another.

What is claimed is:

1. A recording/reading device, comprising:
   first and second magnetic heads, including respectively first and second gaps;
   a magnetic substrate including a common pad to the first and second magnetic heads;
   a first pole and a second pole surmounting said common pad;
   a magnetic circuit for closing a magnetic flux having said pad common to the first and second magnetic heads, wherein said first pole magnetically couples the common pad to the first gap of the first magnetic head through a non-magnetic link, and said second pole magnetically couples the common pad to the second gap of the second magnetic head; and
   a non-magnetic interval having a predetermined thickness and surface separating the first pole from the second pole.

2. A device according to claim 1, wherein the predetermined thickness and surface of the non-magnetic interval are such that the first pole controls a recording/reading operation of the first magnetic head and such that the second pole controls a recording/reading operation of the second magnetic head.

3. A device according to claim 1, wherein the predetermined thickness and surface of the non-magnetic interval are such that the first pole and the second pole both control a recording/reading operation of at least one of the first magnetic head or of the second magnetic head.

4. A device according to claim 1, wherein the non-magnetic link connects the gap of the first magnetic head to the non-magnetic interval and is formed as a single layer.

5. A device according to claim 4, wherein the non-magnetic interval, the gap of the first head and the non-magnetic link each have a thickness of the predetermined thickness.

6. A device according to claim 1, wherein each of the first and second poles occupies about half an area of a surface of the common pad.

7. A device according to claim 1, wherein the non-magnetic interval is entirely contained in a surface of the common pad.

8. A device according to claim 1, where the first and second gaps of the respective first and second magnetic heads are tilted with respect to a surface of the common pad.

9. A device according to claim 8, wherein the first and second gaps have substantially the same tilt.

10. A device according to claim 1, wherein the non-magnetic interval surmounts the common pad and is tilted with respect to a surface of the common pad.

11. A device according to claim 10, wherein the non-magnetic interval has a predetermined tilt.

12. A device according to claim 1, wherein at least one excitation conductor is positioned around the common pad.

13. A recording/reading device, comprising:
   a magnetic substrate including at least one succession of common pads formed on the magnetic substrate;
   a first magnetic head including a first pole and a second pole and first and second successive common pads, the first pole surmounting the first common pad, the second pole surmounting the second common pad, the first and second poles facing each other in defining a first gap;
   a second magnetic head including a third pole and a fourth pole defining a second gap, and the second and a third successive common pad, the second pole of the first magnetic head and the third pole of the second magnetic head surmounting the second common pad;
   a magnetic circuit for closing a magnetic flux having the second common pad of the first and second magnetic heads, wherein the second pole of the first magnetic head magnetically couples the second common pad to the first gap of the first magnetic head through a non-magnetic link, and the third pole of the second magnetic head couples the second common pad to the second gap of the second magnetic head; and a non-magnetic interval separating the second pole from the third pole.

14. A device according to claim 13, wherein each of the poles is located on upper faces of the common pads, the upper faces forming a plane or slightly curved surface.

15. A device according to claim 13, wherein the common pads are arranged in a matrix network.

16. A device according to claim 15, wherein the gaps are arranged in rows.

17. A device according to claim 15, comprising a plurality of non-magnetic intervals, and wherein the non-magnetic intervals are arranged in rows.

18. A device according to claim 16, comprising a plurality of non-magnetic intervals, and wherein the non-magnetic intervals are arranged in rows.

19. A device according to claim 18, wherein the rows of gaps are substantially parallel to the rows of non-magnetic intervals.

20. A device according to claim 13, wherein the fourth pole of the second magnetic head magnetically couples the third common pad to the second gap of the second magnetic head through a second non-magnetic link, and further comprising:

a second non-magnetic interval separating the fourth pole from a fifth pole surmounting the third successive common pad, the first and the second non-magnetic links being located on a same side of respectively the first and the second non-magnetic intervals.

* * * * *